United States Patent
Hara et al.

(10) Patent No.: US 11,507,760 B2
(45) Date of Patent: Nov. 22, 2022

(54) MACHINE TRANSLATION METHOD, MACHINE TRANSLATION SYSTEM, PROGRAM, AND NON-TRANSITORY COMPUTER-READABLE STORAGE MEDIUM

(71) Applicant: SEMICONDUCTOR ENERGY LABORATORY CO., LTD., Atsugi (JP)

(72) Inventors: Ayami Hara, Kanagawa (JP); Junpei Momo, Kanagawa (JP); Tatsuya Okano, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 217 days.

(21) Appl. No.: 16/885,516

(22) Filed: May 28, 2020

(65) Prior Publication Data

US 2020/0387678 A1 Dec. 10, 2020

(30) Foreign Application Priority Data

Jun. 7, 2019 (JP) .............................. JP2019-106667

(51) Int. Cl.
*G06F 40/58* (2020.01)
*G06F 40/51* (2020.01)
(Continued)

(52) U.S. Cl.
CPC ............ *G06F 40/58* (2020.01); *G06F 40/166* (2020.01); *G06F 40/289* (2020.01); *G06F 40/51* (2020.01); *G06N 3/04* (2013.01); *G06N 3/08* (2013.01)

(58) Field of Classification Search
CPC ...... G06F 40/58; G06F 40/166; G06F 40/289; G06F 40/51; G06F 40/40; G06N 3/04; G06N 3/08; G06N 3/0445
(Continued)

(56) References Cited

U.S. PATENT DOCUMENTS

2019/0018842 A1   1/2019   Nomura et al.

FOREIGN PATENT DOCUMENTS

EP          3282368 A1 *  2/2018   ......... G06F 16/3344
JP       2019-020950 A     2/2019

OTHER PUBLICATIONS

Sekizawa.Y et al., "Improvement of neural machine translation by changing low-frequency words to high-frequency words in the target language", The Association for Natural Language Processing The 23rd Annual Convention Collection of Presented Papers, Mar. 13, 2017, pp. 982-985.

* cited by examiner

*Primary Examiner* — Thierry L Pham
(74) *Attorney, Agent, or Firm* — Fish & Richardson P.C.

(57) ABSTRACT

The accuracy of machine translation is increased. A translated document with high translation accuracy is obtained. An original document is faithfully translated. An original document is translated with a neural network to generate a first translated document; a modification-target word or phrase is determined from words and phrases contained in the original document on the basis of an analysis result for the first translated document; the modification-target word or phrase is replaced with a high frequency word in learning data used for learning in the neural network to modify the original document; and the modified original document is translated with the neural network to generate a second translated document.

10 Claims, 5 Drawing Sheets

(51) Int. Cl.
*G06F 40/289* (2020.01)
*G06N 3/04* (2006.01)
*G06F 40/166* (2020.01)
*G06N 3/08* (2006.01)

(58) Field of Classification Search
USPC .............................................................. 704/2
See application file for complete search history.

MACHINE TRANSLATION METHOD, MACHINE TRANSLATION SYSTEM, PROGRAM, AND NON-TRANSITORY COMPUTER-READABLE STORAGE MEDIUM

BACKGROUND OF THE INVENTION

1. Field of the Invention

One embodiment of the present invention relates to a machine translation method, a machine translation system, a program, and a non-transitory computer-readable storage medium.

Note that one embodiment of the present invention is not limited to the above technical field. Examples of the technical field of one embodiment of the present invention include a semiconductor device, a display device, a light-emitting device, a power storage device, a memory device, an electronic device, a lighting device, an input device (e.g., a touch sensor), an input/output device (e.g., a touch panel), a method for driving any of them, and a method for manufacturing any of them.

2. Description of the Related Art

Machine translation, which translates a natural language into another natural language with a computer, has been actively researched and developed. As machine translation, there are rule-based machine translation which performs translation based on rules, statistical machine translation which performs translation with a language model, a translation model, and the like, neural machine translation which performs translation with a neural network, and the like.

In statistical machine translation, learning is performed using various tools through a plurality of steps. Therefore, learning data need to be prepared for each of these tools. In contrast, in neural machine translation, learning is performed with one neural network; thus, the required learning data is only a bilingual corpus containing a pair of an original document and a translated document. This enables easy obtainment of learning data and saves time and effort for humanly creating learning data. Furthermore, neural machine translation tends to achieve higher translation accuracy than rule-based machine translation and statistical machine translation. From these facts, neural machine translation has been increasingly put into practical use.

However, machine translation is not perfect yet and mistranslation occurs. Patent Document 1 discloses a translation method aiming to prevent the occurrence of mistranslation.

REFERENCE

Patent Document

[Patent Document 1] Japanese Published Patent Application No. 2019-20950

SUMMARY OF THE INVENTION

An object of one embodiment of the present invention is to increase the accuracy of machine translation. An object of one embodiment of the present invention is to obtain a translated document with a high translation accuracy by machine translation. An object of one embodiment of the present invention is to obtain a translation result faithful to an original document by machine translation.

An object of one embodiment of the present invention is to provide a machine translation system with high accuracy. An object of one embodiment of the present invention is to provide a machine translation method with high accuracy.

An object of one embodiment of the present invention is to provide a machine translation system capable of faithfully translating an original document. An object of one embodiment of the present invention is to provide a machine translation method capable of faithfully translating an original document.

Note that the description of these objects does not disturb the existence of other objects. One embodiment of the present invention does not need to achieve all the objects. Other objects can be derived from the description of the specification, the drawings, and the claims.

One embodiment of the present invention is a machine translation method including the steps of translating an original document with a neural network to generate a first translated document; determining a modification-target word or phrase from words and phrases contained in the original document on the basis of an analysis result for the first translated document; replacing the modification-target word or phrase with a high frequency word in learning data used for learning in the neural network to modify the original document; and translating the modified original document with the neural network to generate a second translated document.

In the step of determining the modification-target word or phrase, it is preferable that a modification-target sentence be determined from the first translated document and that the modification-target word or phrase be determined from words and phrases contained in a sentence of the original document corresponding to the modification-target sentence.

One embodiment of the present invention is a machine translation method including the steps of translating an original document with a neural network to generate a translated document, analyzing the translated document to obtain a score based on translation accuracy of the translated document, and repeating modification of the original document, generation of a translated document based on the modification, and obtainment of the score of the translated document based on the modification until a termination condition is satisfied. In the method, the modification of the original document includes a step of determining a modification-target word or phrase from words and phrases contained in the original document on the basis of an analysis result for a translated document generated before the step of determining the modification-target word or phrase; and a step of replacing the modification-target word or phrase with a high frequency word in learning data used for learning in the neural network to modify the original document. The generation of the translated document based on the modification includes a step of translating the original document that has reflected the latest modification with the neural network to generate a translated document based on the latest modification.

In the step of determining the modification-target word or phrase, it is preferable that a modification-target sentence be determined from the translated document and that the modification-target word or phrase be determined from words and phrases contained in a sentence of the original document corresponding to the modification-target sentence.

It is preferable that the high frequency word be selected from synonyms of the modification-target word or phrase.

One embodiment of the present invention is a document search system having a function of executing at least one of the above-described machine translation methods.

One embodiment of the present invention is a machine translation system including a processor. The processor has a function of translating an original document with a neural network to generate a first translated document, a function of determining a modification-target word or phrase from words and phrases contained in the original document on the basis of an analysis result for the first translated document, a function of replacing the modification-target word or phrase with a high frequency word in learning data used for learning in the neural network to modify the original document, and a function of translating the modified original document with the neural network to generate a second translated document.

One embodiment of the present invention is a program having a function of making a processor execute at least one of the above-described machine translation methods. One embodiment of the present invention is a non-transitory computer-readable storage medium in which the program is stored.

The program may be supplied to a computer by various types of transitory computer-readable storage mediums. Examples of the transitory computer-readable storage medium are an electric signal, an optical signal, and an electromagnetic wave. The transitory computer-readable storage medium can supply a program to a computer through a wired communication path such as an electric wire or an optical fiber or a wireless communication path.

One embodiment of the present invention is a program causing a processor to execute a step of translating an original document with a neural network to generate a first translated document, a step of determining a modification-target word or phrase from words and phrases contained in the original document on the basis of an analysis result for the first translated document, a step of replacing the modification-target word or phrase with a high frequency word in learning data used for learning in the neural network to modify the original document, and translating the modified original document with the neural network to generate a second translated document. One embodiment of the present invention is a non-transitory computer-readable storage medium storing the program.

As the non-transitory computer-readable storage medium, various types of substantial storage mediums can be used. Examples of the non-transitory computer-readable storage medium include a volatile memory such as a random access memory (RAM), a nonvolatile memory such as a read only memory (ROM), a storage media drive such as a hard disk drive (HDD) or a solid state drive (SSD), a magneto-optical disk, CD-ROM, and CD-R.

With one embodiment of the present invention, the accuracy of machine translation can be increased. With one embodiment of the present invention, a translated document with a high translation accuracy can be obtained. With one embodiment of the present invention, a translation result faithful to an original document can be obtained by machine translation.

With one embodiment of the present invention, a machine translation system with high accuracy can be provided. With one embodiment of the present invention, a machine translation method with high accuracy can be provided.

With one embodiment of the present invention, a machine translation system capable of faithfully translating an original document can be provided. With one embodiment of the present invention, a machine translation method capable of faithfully translating an original document can be provided.

Note that the description of these effects does not preclude the existence of other effects. One embodiment of the present invention does not need to have all of these effects. Other effects can be derived from the description of the specification, the drawings, and the claims.

DETAILED DESCRIPTION OF THE INVENTION

Figure 1:
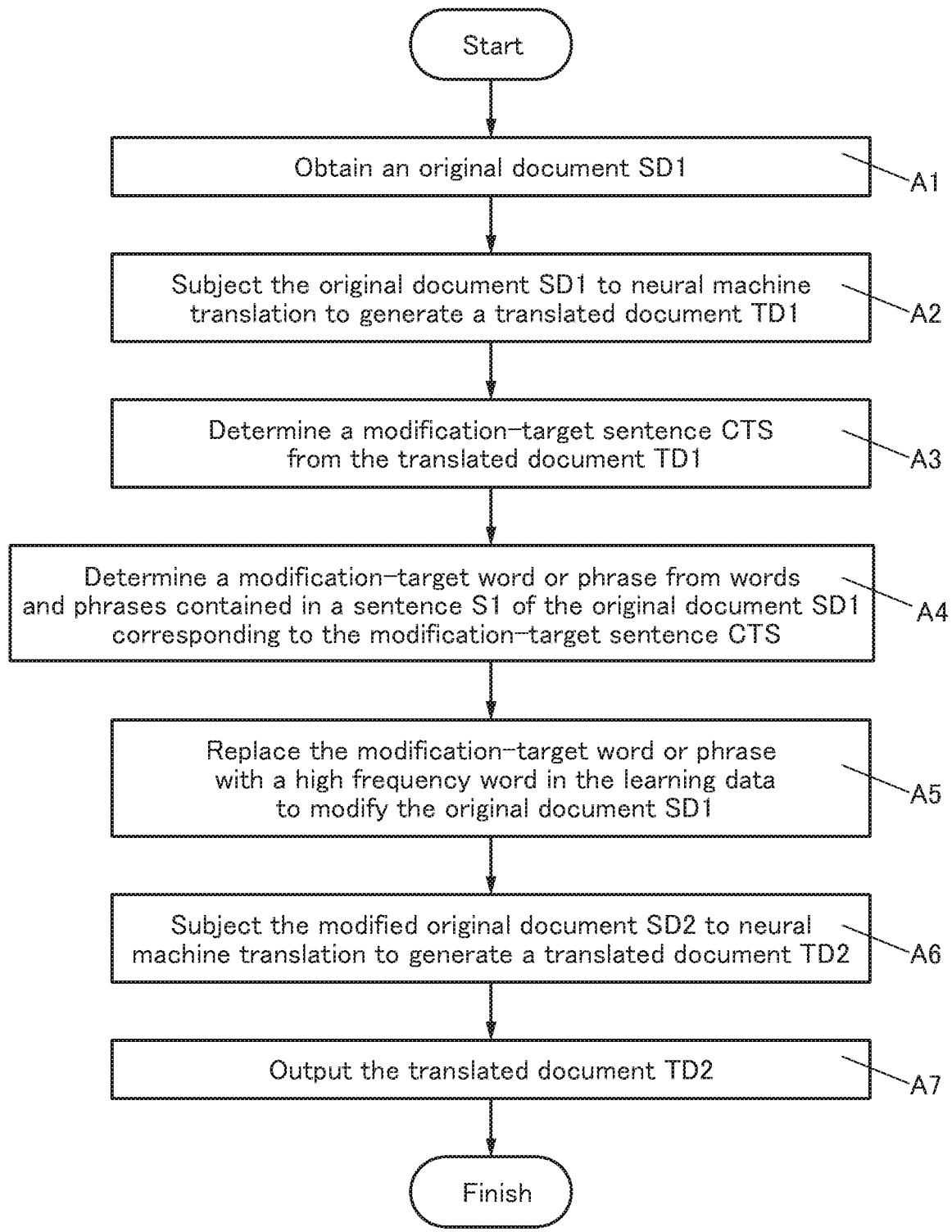
FIG. 1 is a flow chart showing an example of a machine translation method.

Embodiments will be described in detail with reference to the drawings. Note that the present invention is not limited to the following description, and it will be readily appreciated by those skilled in the art that modes and details of the present invention can be modified in various ways without departing from the spirit and scope of the present invention. Therefore, the present invention should not be construed as being limited to the description in the following embodiments.

Note that in structures of the invention described below, the same portions or portions having similar functions are denoted by the same reference numerals in different drawings, and the description thereof is not repeated. The same hatching pattern is used for portions having similar functions, and the portions are not denoted by specific reference numerals in some cases.

In addition, the position, size, range, or the like of each structure illustrated in drawings does not represent the actual position, size, range, or the like in some cases for easy understanding. Therefore, the disclosed invention is not necessarily limited to the position, size, range, or the like disclosed in the drawings.

Embodiment 1

In this embodiment, a machine translation method of one embodiment of the present invention will be described with reference to FIG. 1 to FIG. 3.

In a machine translation method of one embodiment of the present invention, artificial intelligence (AI) is used to translate an original document and generate a translated document. Specifically, in a machine translation method of one embodiment of the present invention, artificial neural network (ANN; hereinafter also simply referred to as a neural network) is used. The neural network is obtained with a circuit (hardware) or a program (software).

In this specification and the like, the neural network indicates a general model having the capability of solving problems, which is modeled on a biological neural network and determines a connection strength of neurons by learning. The neural network includes an input layer, a middle layer (hidden layer), and an output layer.

In the description of the neural network in this specification and the like, to determine a connection strength of neurons (also referred to as weight coefficient) from the existing information is referred to as "leaning" in some cases.

In this specification and the like, to draw a new conclusion from a neural network formed with the connection strength obtained by learning is referred to as "inference" in some cases. In one embodiment of the present invention, translating an original document with a neural network corresponds to inference.

In this specification and the like, translation using a neural network is referred to as "neural machine translation", in some cases.

The neural machine translation may cause mistranslation.

For learning in a neural network, learning data (also referred to as a corpus for leaning) containing many sets each consisting of an original document and a translated document is used. A word or phrase which is not contained in the learning data but is in an original document cannot be translated properly by neural machine translation, in some cases.

Moreover, when the input layer and the output layer of the neural network are each on a higher level, the calculation amount becomes enormous. Thus, the vocabulary of each language (a language of an original document and a language of a translated document) used for leaning is limited to a certain number. Specifically, the vocabulary used for learning is limited to words which are frequently used in learning data (such words are hereinafter also referred to as high frequency words). Words which are not frequently used in learning data (such words are hereinafter also referred to as low frequency words) are replaced with special symbols representing unknown words. In the case where a word replaced as an unknown word is contained in an original document, it is difficult to properly translate the word by neural machine translation.

Furthermore, even a sentence that uses words selected as high frequency words in learning data tends to be mistranslated by neural machine translation when the order of words or the combination of words is uncommon, for example.

In addition, neural machine translation involves characteristic errors. For example, an error that the same word (or phrase) appears repeatedly, an error that a word (or phrase) which does not correspond to that in an original document appears, and the like often arise in a translated document obtained by neural machine translation.

As a method for reducing mistranslation in a translated document, there is a method in which an original document is modified to an expression that fits into a learned model of a neural network before being subjected to neural machine translation. However, if an original document is modified before neural machine translation is performed, the original document might be modified to an excessive extent and a translation result faithful to the original document might not be obtained.

In view of the foregoing, in a machine translation method of one embodiment of the present invention, an original document is translated first with the use of a neural network, to generate a first translated document. Next, on the basis of an analysis result for the first translated document, a modification-target word or phrase is determined from the words and phrases contained in the original document. Next, the original document is modified by replacing the modification-target word or phrase with a high frequency word in learning data which is used for neural network's learning. Then, the modified original document is translated with the neural network, so that a second translated document is generated.

In the machine translation method, neural machine translation is performed once and the translation result is analyzed. Then, a word or phrase to be modified in the original document is determined on the basis of the analysis result. In this way, excessive modification of the original document can be prevented and a translated document faithful to the original document can be generated. Furthermore, at the time of modification of the word or phrase in the original document, the word or phrase is replaced with a high frequency word in learning data which is used for neural network's learning. Thus, translation accuracy of neural machine translation can be increased.

Furthermore, in a machine translation method of one embodiment of the present invention, an original document is translated with a neural network to generate a translated document, and the translated document is subjected to an error check to obtain a score based on the translation accuracy of the translated document. The modification of the original document, the generation of a translated document based on the modification, and the obtainment of a score for the translated document based on the modification repeat until a termination condition is satisfied.

The number of mistranslations in a translated document is not limited to one sentence and might be a plurality of sentences. If many locations in an original document are modified at once, it is difficult to judge which modification is effective and which modification is undesirable. Furthermore, the number of modification candidates of an original document is not limited to one, and there might be a plurality of modification candidates. In such a case, a plurality of original documents each subjected to a different modification may be created, and the plurality of original documents may each be translated to generate a plurality of translated documents based on different modifications. For example, the modification of an original document may repeat until the above-mentioned score reaches a reference value. Alternatively, a predetermined number of original documents each subjected to a different modification and the predetermined number of corresponding translated documents may be created and a translated document with the highest score may be output as a translation result, for example.

Machine Translation Method Example 1

Figure 2A:
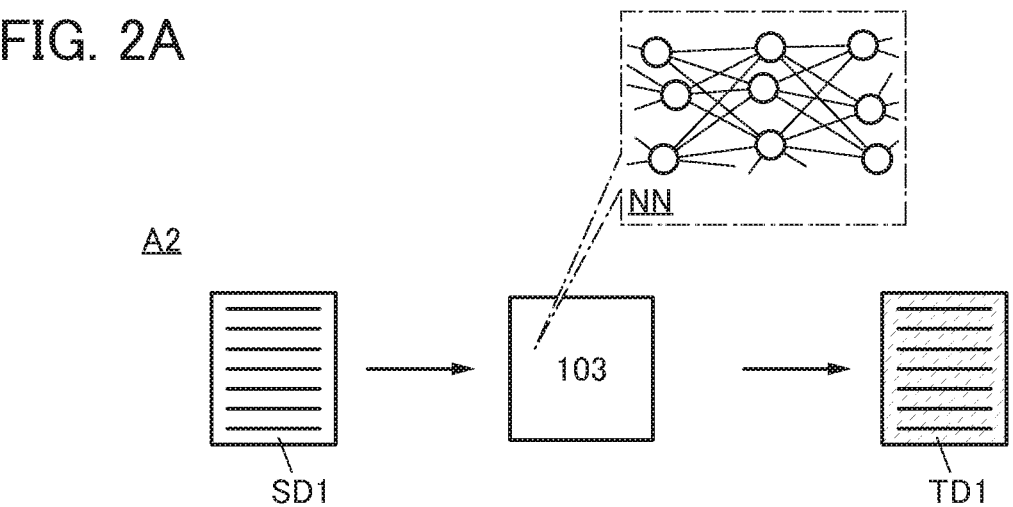
FIGS. 2A to 2C are schematic views showing an example of a machine translation method.
Figure 2B:
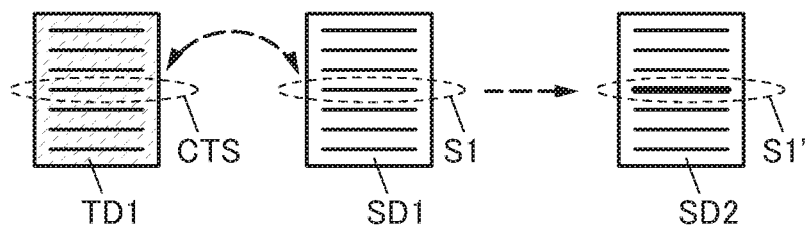
Figure 2C:
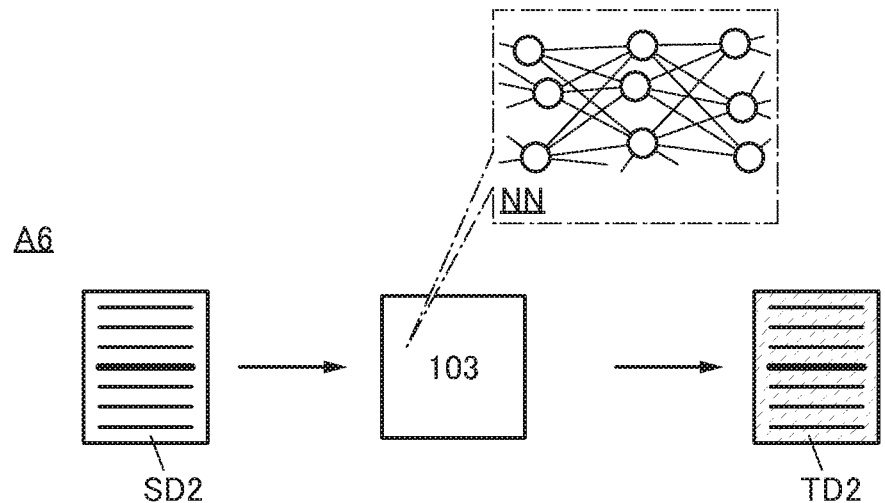

FIG. 1 is a flow chart of a machine translation method. As shown in FIG. 1, the machine translation method of one embodiment of the present invention includes seven steps, Step A1 to Step A7. FIG. 2A is a schematic view of Step A2, FIG. 2B is a schematic view of Steps A3, A4, and A5, and FIG. 2C is a schematic view of Step A6.

[Step A1: Obtaining an Original Document SD1]

First, an original document SD1 is obtained. The original document SD1 may contain one or more sentences.

For example, the original document SD1 in the form of text data, audio data, or image data is supplied from the outside. In the case where audio data or image data is supplied, text data is created from the supplied data.

The original document is not particularly limited and may be a document relating to intellectual property, for example. Specific examples of the document relating to intellectual property include a specification, a scope of claims, and an abstract used for patent application. Publications such as a patent document (e.g., published application publication, and a patent publication), a utility model publication, a design publication, and a paper are also examples of the document relating to intellectual property. Not only publications issued domestically but also those issued in foreign countries can be used as the document relating to intellectual property.

Other examples of the original document include an e-mail, a book, a newspaper, a paper, a report, a column, and other various kinds of written things. Furthermore, a specification, a medical document, or the like may also be used as the original document.

Moreover, the language of the original document is also not particularly limited, and documents written in Japanese, English, Chinese, Korean, or other languages can be used, for example.

[Step A2: Subjecting the Original Document SD1 to Neural Machine Translation to Generate a Translated Document TD1]

Next, as shown in FIG. 2A, a neural network NN included in a processor 103 is used to translate the original document SD1, so that a translated document TD1 is generated.

As the neural network NN, recurrent neural network (RNN), which is capable of handling variable-length data such as text data, can be used, for example.

The model and mechanism used in neural machine translation is not particularly limited. For example, a sequence-to-sequence model, a transformer model, an attention mechanism, or the like can be used.

The language of the translated document is not particularly limited as long as the language is different from that of the original document and can be Japanese, English, Chinese, Korean, or other languages, for example.

[Step A3: Determining a Modification-Target Sentence CTS From the Translated Document TD1]

Next, the translated document TD1 is analyzed and a sentence having a possible mistranslation (a modification-target sentence CTS) is determined. FIG. 2B shows an example in which a sentence having a possible mistranslation contained in the translated document TD1 is determined as the modification-target sentence CTS.

Step A3 can be regarded as an error check for the entire translated document TD1. A score serving as an evaluation indicator of the translation accuracy of the translated document TD1 is preferably calculated by the analysis.

The analysis of the translated document TD1 preferably detects at least one of a sentence in which the same word (or phrase) appears repeatedly, a sentence which contains a word (or phrase) that does not contained in the original document SD1, a sentence with a grammatical error, a sentence containing a special symbol, and the like.

By one or more kinds of processing, a sentence having a possible mistranslation can be detected. For example, a sentence having a possible mistranslation can be detected by a variety of natural language processing, for example.

For example, nouns contained in the original document SD1 may be checked against nouns contained in the translated document TD1 with a word dictionary prepared in advance.

Furthermore, a result of back-translating the translated document TD1 into the language of the original document SD1 may be checked against the original document SD1.

To detect a sentence having a possible mistranslation, a probability value for an output result of a neural machine translation model may be analyzed. In neural machine translation, a word having the highest probability in the translation language is output in consideration of which word in an original sentence is strongly relevant (weight coefficient in the middle layer). In the case where the probability of the output word is low, a sentence containing such a word can be judged to have a possible mistranslation.

To detect a sentence having a possible mistranslation, information on translation results of the past stored in a server or the like may be used as well. For example, information on the strength of word relevance between an original sentence and a translated sentence (weight coefficient in the middle layer in the neural network NN) is stored in advance, and in the case where a strong relevance to a word that is different from the past is seen, it is judged that a possible mistranslation occurs.

Note that the number of modification-target sentences may be one or more. When there are a plurality of modification-target sentences, after Steps A4 and A5 are performed for each of the sentences, Step A6 may be performed, for example. Alternatively, after Steps A4 to A6 are performed for one of the sentences, the process may return to Step A3 or A4, and then the similar processing may be repeated for the rest of the sentences.

[Step A4: Determining a Modification-Target Word or Phrase From Words and Phrases Contained in a Sentence S1 of the Original Document SD1 Corresponding to the Modification-Target Sentence CTS]

Next, a word or phrase (a modification-target word or phrase) which is expected to be a cause of mistranslation is determined from words and phrases contained in the original document SD1. FIG. 2B shows an example in which the original document SD1 contains a sentence S1 corresponding to the modification-target sentence CTS and a modification-target word or phrase is determined from the words and phrases contained in the sentence S1. Note that the modification-target word or phrase may be either a word or a phrase.

As the word or phrase which is expected to be a cause of mistranslation among the words and phrases contained in the sentence S1, a word with a relatively low usage frequency among the words used for the neural network NN's learning (i.e., the words not replaced with a special symbol representing an unknown word) can be given, for example. Referring to information on the word usage frequency in the learning data used for the neural network NN's learning enables the word with the lowest usage frequency or the phrase containing the word with the lowest usage frequency to be judged to be the modification-target word or phrase.

The word usage frequency can be obtained by calculation of a term frequency (TF) value of the word, for example. Furthermore, a term frequency inverse document frequency (TF-IDF) value of words may be used in determining a modification-target word or phrase.

To detect a word or phrase which is expected to be a cause of mistranslation, a weight coefficient in the middle layer of the neural network NN may be analyzed. In neural machine translation, which word in an original sentence is relevant to the output word can be noticed by referring to the weight coefficient in the middle layer. For example, a word which is weakly relevant to all the words in the original sentence is judged to be a modification-target word or phrase.

The method for determining the modification-target word or phrase is not limited to the above-described method and a variety of methods can be used.

[Step A5: Replacing the Modification-Target Word or Phrase With a High Frequency Word in the Learning Data to Modify the Original Document SD1]

Next, the original document SD1 is modified by replacing the modification-target word or phrase with a high frequency word in the learning data which is used for the neural network NN's learning, so that an original document SD2 is created. In the following description, the modified original document SD2 shown in FIG. 2B includes a sentence S1' in which the modification-target word or phrase in the sentence S1 is replaced with a different word or phrase.

Replacing the modification-target word or phrase with a high frequency word in the learning data which is used for the neural network NN's learning can increase translation accuracy of neural machine translation.

However, it is undesirable that modification of the original document SD1 for reducing mistranslation produce a translation that is not faithful to the content of the unmodified original document SD1. Therefore, the modification-target word or phrase is preferably replaced with a synonym of the modification-target word or phrase. In this way, modification of the original document SD1 can be prevented from largely changing the content of the original document SD1. Thus, translation that is faithful to the content of the unmodified original document SD1 can be performed and a reduction of mistranslation can be achieved.

Specifically, it is preferable that a plurality of synonyms of the modification-target word or phrase be extracted, a word with a high usage frequency in the learning data which is used for the neural network NN's learning be selected from the plurality of synonyms, and the modification-target word or phrase be replaced with the selected word.

The synonyms of the modification-target word or phrase can be obtained with a dictionary prepared in advance, for example. Furthermore, the synonyms of the modification-target word or phrase may be extracted on the basis of the similarity or the distance of distributed representation vectors of the words.

The high frequency word in the learning data which is used for the neural network NN's learning can be selected on the basis of information on the word usage frequency in the learning data.

The word usage frequency can be obtained by calculation of a TF value of the word, for example. Furthermore, a TF-IDF value of the word may be used.

Note that there may be one or more candidates for the word (or phrase) with which the modification-target word or phrase is replaced. For example, a word with the highest usage frequency in the learning data or a plurality of words with high usage frequencies may be used as the candidate for the word for the replacement. In the case where there are a plurality of candidates for the word for replacement, a plurality of original documents in each of which the modification-target word or phrase is replaced with a different word may be created, and a plurality of translated documents based on each modification may be created in Step A6. In this case, as in the above-described Step A3, calculation of a score based on the translation accuracy is preferably possible by the analysis of the translated document in order to easily determine the best translation result among the plurality of translated documents.

Note that in the case where the modification-target word or phrase includes a plurality of words, each of the words may be replaced with a different word. Alternatively, only one or some of the words may be replaced with a different word.

[Step A6: Subjecting the Modified Original Document SD2 to Neural Machine Translation to Generate a Translated Document TD2]

Next, as shown in FIG. 2C, the neural network NN included in a processor 103 is used to translate the modified original document SD2, so that a translated document TD2 is generated.

[Step A7: Outputting the Translated Document TD2]

Then, the translated document TD2 is output.

For example, the translated document TD2 is output to the outside in the form of text data, audio data, or image data. In the case where audio data or image data is output, the audio data or the image data is created on the basis of the text data generated in Step A6.

Although an example in which automatic processing is performed with a machine in the machine translation method of this embodiment is described, part of the processing may be performed humanly. For example, designation of the modification-target sentence in Step A3, designation of the modification-target word or phrase in Step A4, or the like may be performed humanly.

Furthermore, the data used in the machine translation method of this embodiment and the data generated therein may be stored in a server, a memory, or the like as appropriate. For example, at least one of the original document obtained in Step A1, the translated documents generated in Step A2 and Step A6, the modified original document generated in Step A5, and the like may be stored in a server, a memory, or the like.

Moreover, when neural network's learning is performed again, either or both of a set of the original document SD1 and the translated document TD1 and a set of the original document SD2 and the translated document TD2 may be added to the learning data. Thus, translation accuracy of neural machine translation can be increased.

Machine Translation Method Example 2

Figure 3:
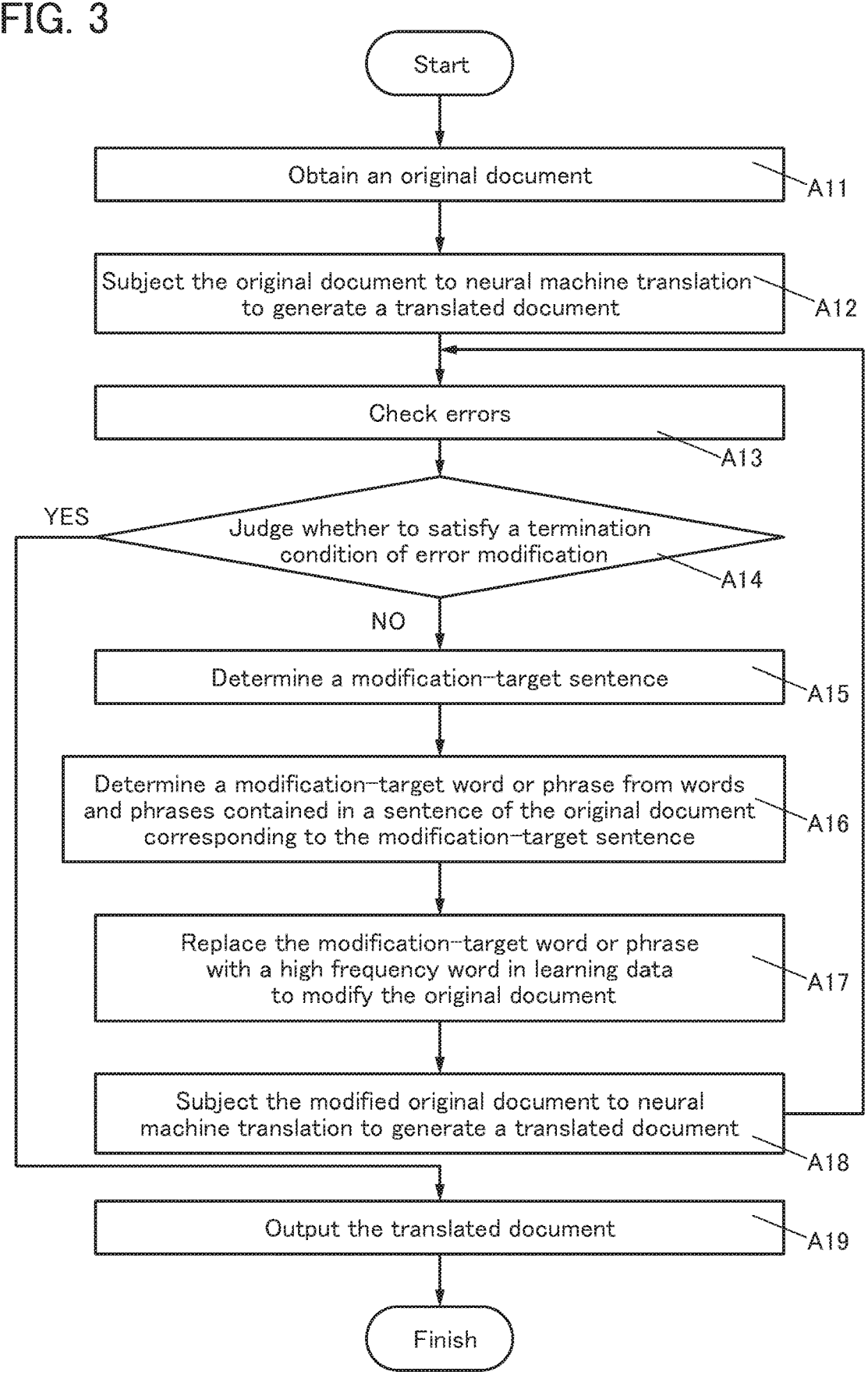
FIG. 3 is a flow chart showing an example of a machine translation method.

FIG. 3 is a flow chart of a machine translation method. As shown in FIG. 3, the machine translation method of one embodiment of the present invention includes nine steps, Step A11 to Step A19. For the points similar to those of Steps A1 to A7, detailed description is omitted.

[Step A11: Obtaining an Original Document]

First, an original document is obtained in a manner similar to that of Step A1.

[Step A12: Subjecting the Original Document to Neural Machine Translation to Generate a Translated Document]

Next, in a manner similar to that of Step A2, a neural network is used to translate the original document, so that a translated document is generated.

[Step A13: Checking Errors]

Next, an error check is performed. In this error check, the translated document generated before this step (Step A12 or Step A18 described later) is analyzed and a score based on the translation accuracy of the translated document is calculated. The score serves as an evaluation indicator of the translation accuracy. Therefore, error modification is performed a plurality of times, and when a plurality of modification candidates (translated documents) are obtained, the translated document with high translation accuracy can be determined using the score.

[Step A14: Judging Whether to Satisfy a Termination Condition of Error Modification]

Next, whether to satisfy a termination condition of error modification is judged. If the termination condition is satisfied, the processing goes to Step A19. If the termination condition is not satisfied, the processing goes to Step A15.

The termination condition of error modification is not particularly limited. For example, when the score calculated in Step A13 reaches a reference value (i.e., when the number of mistranslations becomes sufficiently small), the error modification may be terminated. Alternatively, after error modification is performed a predetermined number of times, the error modification may be terminated.

[Step A15: Determining a Modification-Target Sentence]

Next, in a manner similar to that of Step A3, a sentence having a possible mistranslation (a modification-target sentence) is determined from the translated document. The modification-target sentence may be determined using a result of the error check performed in Step A13.

[Step A16: Determining a Modification-Target Word or Phrase From Words and Phrases Contained in a Sentence of the Original Document Corresponding to the Modification-Target Sentence]

Next, in a manner similar to that of Step A4, a word or phrase (a modification-target word or phrase) which is expected to be a cause of mistranslation is determined from words and phrases contained in the original document. [Step A17: Replacing the Modification-Target Word or Phrase With a High Frequency Word in Learning Data to Modify the Original Document]

Next, in a manner similar to that of Step A5, the original document is modified by replacing the modification-target word or phrase with a high frequency word in learning data which is used for neural network's learning.

[Step A18: Subjecting the Modified Original Document to Neural Machine Translation to Generate a Translated Document]

Next, in a manner similar to that of Step A6, the neural network is used to translate the modified original document, so that a translated document is generated. After Step A18 is finished, the processing goes to Step A13.

[Sep A19: Outputting the Translated Document]

In the case where the termination condition of error modification is satisfied in Step A14, the translated document is output. For example, in the case where the error modification is terminated when the score calculated in Step A13 reaches a reference value, the translated document with the score reaching the reference value is preferably output. In the case where error modification is terminated after a predetermined number of times of error modifications, it is preferable to compare scores of the predetermined number of translated documents and output a translated document with the highest translation accuracy. The number of output translated documents may be one or more.

As described above, in the machine translation method of this embodiment, neural machine translation is performed once, and a word or phrase to be modified in the original document is determined on the basis of the translation result. In this way, excessive modification of the original document can be prevented and a translated document faithful to the original document can be generated. Furthermore, at the time of modification of the word or phrase in the original document, the word or phrase is replaced with a high frequency word in learning data which is used for neural network's learning. Thus, translation accuracy of neural machine translation can be increased.

This embodiment can be combined with the other embodiment as appropriate. In this specification, in the case where a plurality of structural examples are shown in one embodiment, the structural examples can be combined as appropriate.

Embodiment 2

In this embodiment, a machine translation system of one embodiment of the present invention will be described with reference to FIG. 4 and FIG. 5.

The machine translation system of one embodiment of the present invention can translate a natural language into another natural language by using the machine translation method described in Embodiment 1. Accordingly, translation faithful to the original document can be achieved with high translation accuracy.

Structural Example 1 of Machine Translation System

Figure 4:
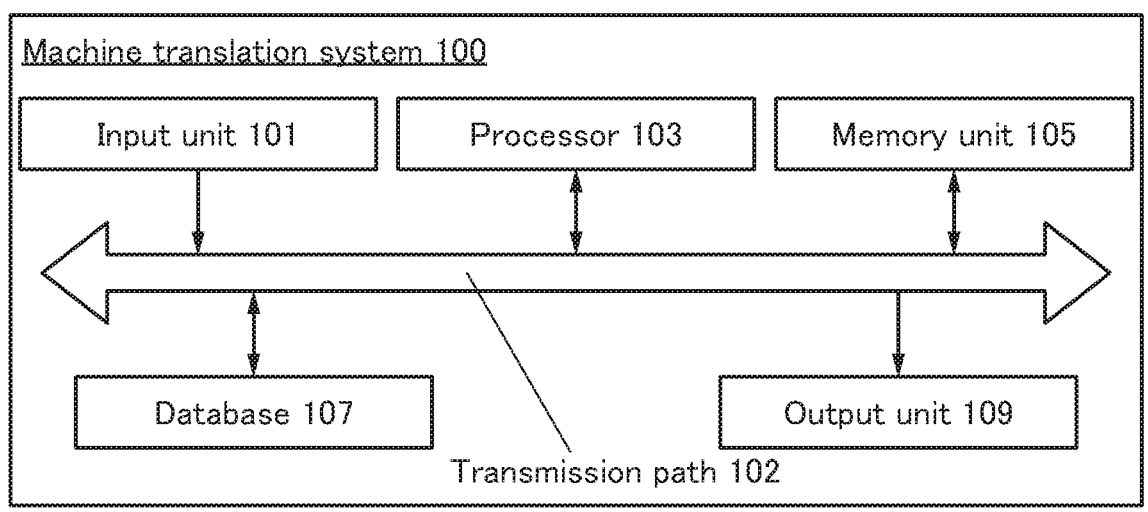
FIG. 4 is a block diagram showing an example of a machine translation system.

FIG. 4 is a block diagram of a machine translation system 100. Note that in block diagrams attached to this specification, components are classified according to their functions and shown as independent blocks; however, it is practically difficult to completely separate the components according to their functions, and one component may have a plurality of functions. Moreover, one function can relate to a plurality of components; for example, processing of the processor 103 can be executed on different servers.

The machine translation system 100 includes at least the processor 103. The machine translation system 100 shown in FIG. 4 further includes an input unit 101, a transmission path 102, a memory unit 105, a database 107, and an output unit 109.

[Input Unit 101]

An original document is supplied from the outside of the machine translation system 100 to the input unit 101. The original document supplied to the input unit 101 is supplied to the processor 103, the memory unit 105, or the database 107 through the transmission path 102.

The original document is input in the form of text data, audio data, or image data, for example.

Examples of a method for inputting the original document are key input with a keyboard, a touch panel, or the like, audio input with a microphone, reading from a recording medium, image input with a scanner, a camera, or the like, and obtainment via communication.

The machine translation system 100 preferably has a function of converting audio data to text data. For example, the processor 103 may have the function.

Alternatively, the machine translation system 100 may further include an audio conversion unit having the function.

The machine translation system 100 preferably has an optical character recognition (OCR) function. Thus, text contained in image data can be recognized and text data can be created. For example, the processor 103 may have the function. Alternatively, the machine translation system 100 may further include a character recognition unit having the function.

[Transmission Path 102]

The transmission path 102 has a function of transmitting various data. The data transmission and reception among the input unit 101, the processor 103, the memory unit 105, the database 107, and the output unit 109 can be performed through the transmission path 102. For example, data such as an original document or a translated document is transmitted and received through the transmission path 102.

[Processor 103]

The processor 103 has a function of performing an operation using data supplied from the input unit 101, the memory unit 105, the database 107, and the like. The processor 103 can supply an operation result to the memory unit 105, the database 107, the output unit 109, and the like.

The processor 103 has a function of performing neural machine translation and generating a translated document. For example, an original document input to the input unit 101 or an original document modified by the processor 103 can be translated.

The processor 103 has a function of determining a modification-target sentence from the translated document. In addition, the processor 103 has a function of determining a modification-target word or phrase from words and phrases contained in a sentence of an original document corresponding to the modification-target sentence. The processor 103 has a function of replacing a modification-target word or phrase with a high frequency word in learning data to modify an original document and generating a modified original document.

The processor 103 preferably includes a transistor whose channel formation region includes a metal oxide. The transistor has an extremely low off-state current; therefore, with the use of the transistor as a switch for retaining electric charge (data) which has flown into a capacitor serving as a memory element, a long data retention period is feasible. When at least one of a register and a cache memory included in the processor 103 has such a feature, the processor 103 can be operated only when needed, and otherwise can be off while information processed immediately before switch-off is stored in the memory element; accordingly, normally-off computing is possible and the power consumption of the machine translation system can be reduced.

In this specification and the like, a transistor including an oxide semiconductor or a metal oxide in its channel formation region is referred to as an oxide semiconductor transistor or an OS transistor. The channel formation region of an OS transistor preferably includes a metal oxide.

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide used in a semiconductor layer of a transistor is referred to as an oxide semiconductor in some cases. That is to say, a metal oxide that has at least one of an amplifying function, a rectifying function, and a switching function can be referred to as metal oxide semiconductor, or OS for short.

The metal oxide in the channel formation region preferably contains indium (In). The metal oxide in the channel formation region that contains indium increases the carrier mobility (electron mobility) of the OS transistor. The metal oxide in the channel formation region is preferably an oxide semiconductor containing an element M. The element M is preferably aluminum (Al), gallium (Ga), tin (Sn), or the like. Other elements that can be used as the element M are boron (B), silicon (Si), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that two or more of the above elements can be used in combination as the element M in some cases. The element M is an element having high bonding energy with oxygen, for example. The element M is an element whose bonding energy with oxygen is higher than that of indium, for example. The metal oxide in the channel formation region preferably contains zinc (Zn). The metal oxide containing zinc is easily crystallized in some cases.

The metal oxide in the channel formation region is not limited to a metal oxide containing indium. The semiconductor layer may be, for example, a metal oxide that does not contain indium but contains at least one of zinc, gallium, and tin (e.g., zinc tin oxide or gallium tin oxide).

Furthermore, a transistor including silicon in a channel formation region may be used in the processor 103.

In the processor 103, a transistor including an oxide semiconductor in a channel formation region and a transistor including silicon in a channel formation region are preferably used in combination.

The processor 103 includes, for example, an operation circuit, a central processing unit (CPU), or the like.

The processor 103 may include a microprocessor such as a digital signal processor (DSP) or a graphics processing unit (GPU). The microprocessor may be configured with a programmable logic device (PLD) such as a field programmable gate array (FPGA) or a field programmable analog array (FPAA). The processor 103 can interpret and execute instructions from programs to process various kinds of data and control programs. The programs to be executed by the processor are stored in at least one of a memory region of the processor or the memory unit 105.

The processor 103 may include a main memory. The main memory includes at least one of a volatile memory such as a RAM and a nonvolatile memory such as a ROM.

For example, a dynamic random access memory (DRAM) or a static random access memory (SRAM) is used as the RAM, in which case a virtual memory space is assigned to the RAM to be used as a work space for the processor 103. An operating system, an application program, a program module, program data, a look-up table, and the like which are stored in the memory unit 105 are loaded into the RAM and executed. The data, program, and program module which are loaded into the RAM are each directly accessed and operated by the processor 103.

The ROM can store a basic input/output system (BIOS), firmware, and the like for which rewriting is not needed. Examples of the ROM include a mask ROM, a one-time programmable read only memory (OTPROM), and an erasable programmable read only memory (EPROM). Examples of the EPROM include an ultra-violet erasable programmable read only memory (UV-EPROM) which can erase stored data by irradiation with ultraviolet rays, an electrically erasable programmable read only memory (EEPROM), and a flash memory.

[Memory Unit 105]

The memory unit 105 has a function of storing a program to be executed by the processor 103. Furthermore, the memory unit 105 may have a function of storing an operation result generated by the processor 103 (e.g., translated document, error check result, list of modification candidates, list of modification-target words or phrases, or modified original document) and data input to the input unit 101 (e.g., original document), for example.

The memory unit 105 includes at least one of a volatile memory and a nonvolatile memory. For example, the memory unit 105 may include a volatile memory such as a DRAM or an SRAM. For example, the memory unit 105 may include a nonvolatile memory such as a resistive random access memory (ReRAM), a phase change random access memory (PRAM), a ferroelectric random access memory (FeRAM), or a magnetoresistive random access memory (MRAM), or a flash memory. In some cases, the memory unit 105 may include a storage media drive such as a hard disk drive (HDD) or a solid state drive (SSD).

[Database 107]

The database 107 has at least a function of storing information on the word usage frequency in learning data used for neural network NN's learning. Furthermore, the database 107 may have a function of storing an operation result generated by the processor 103 (e.g., translated document, error check result, list of modification candidates, list of modification-target words or phrases, or modified original document) and data input to the input unit 101 (e.g., original document), for example. Note that the memory unit 105 and the database 107 are not necessarily separated from each other. For example, the machine translation system may include a storage unit that has both the function of the memory unit 105 and that of the database 107.

Note that memories included in the processor 103, the memory unit 105, and the database 107 can each be regarded as an example of a non-transitory computer-readable storage medium.

[Output unit 109]

The output unit 109 has a function of supplying data to the outside of the machine translation system 100. For example, the output unit 109 can supply a result of operation performed by the processor 103 to the outside. For example, the output unit 109 can supply a translated document corresponding to an input original document to the outside.

Note that the machine translation system 100 may have a function of generating one or both of audio data and image data with the use of text data of the translated document.

Structural Example 2 of Machine Translation System

Figure 5:
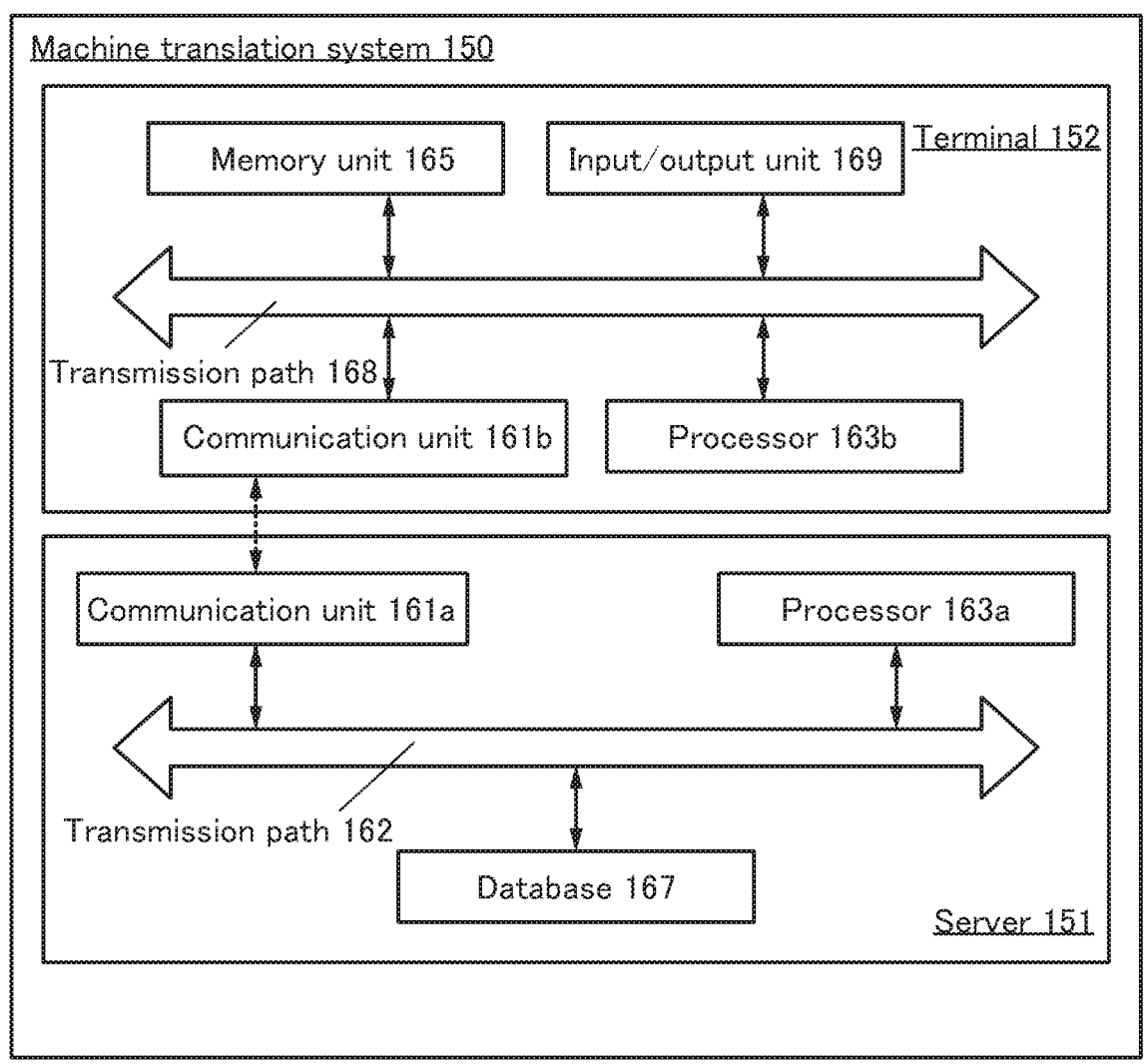
FIG. 5 is a block diagram showing an example of a machine translation system.

FIG. 5 is a block diagram of a machine translation system 150. The machine translation system 150 includes a server 151 and a terminal 152 (e.g., personal computer).

The server 151 includes a communication unit 161a, a transmission path 162, a processor 163a, and a database 167. The server 151 may further include a memory unit, an input/output unit, or the like (not shown in FIG. 5).

The terminal 152 includes a communication unit 161b, a transmission path 168, a processor 163b, a memory unit 165, and an input/output unit 169. The terminal 152 may further include a database or the like (not shown in FIG. 5).

A user of the machine translation system 150 inputs an original document from the terminal 152 to the server 151. The original document is transmitted from the communication unit 161b to the communication unit 161a.

The original document received by the communication unit 161a is stored in the database 167 or a memory unit (not shown) through the transmission path 162. Alternatively, the original document may be directly supplied to the processor 163a from the communication unit 161a.

The generation of a translated document, the determination of a modification-target sentence, the determination of a modification-target word or phrase, and the modification of an original document, which are described in Embodiment 1, require high processing capabilities. The processor 163a included in the server 151 has higher processing capability than the processor 163b included in the terminal 152. These processing steps are each preferably performed by the processor 163a.

The processor 163a generates a translated document. The translated document is stored in the database 167 or the memory unit (not shown) through the transmission path 162. Alternatively, the translated document may be directly supplied to the communication unit 161a from the processor 163a. After that, the translated document is output from the server 151 to the terminal 152. The translated document is transmitted from the communication unit 161a to the communication unit 161b.

[Input/Output Unit 169]

Data is supplied from the outside of the machine translation system 150 to the input/output unit 169. The input/output unit 169 has a function of supplying data to the outside of the machine translation system 150. Note that an input unit and an output unit may be separated from each other as in the machine translation system 100.

[Transmission Path 162 and Transmission Path 168]

The transmission path 162 and the transmission path 168 have a function of transmitting data. The communication unit 161a, the processor 163a, and the database 167 can transmit and receive data through the transmission path 162. The communication unit 161b, the processor 163b, the memory unit 165, and the input/output unit 169 can transmit and receive data through the transmission path 168.

[Processor 163a and Processor 163b]

The processor 163a has a function of performing an operation with the use of data supplied from the communication unit 161a, the database 167, or the like. The processor 163b has a function of performing an operation with the use of data supplied from the communication unit 161b, the memory unit 165, the input/output unit 169, or the like. The description of the processor 103 can be referred to for the processor 163a and the processor 163b. The processor 163a preferably has higher processing capacity than the processor 163b.

[Memory Unit 165]

The memory unit 165 has a function of storing a program to be executed by the processor 163b. The memory unit 165 has a function of storing an operation result generated by the processor 163b, data input to the communication unit 161b, data input to the input/output unit 169, and the like.

[Database 167]

The database 167 has at least a function of storing information on the word usage frequency in learning data used for neural network NN's learning. The database 167 may have a function of storing an operation result generated by the processor 163a, data input to the communication unit 161a, and the like. Furthermore, the server 151 may include a memory unit in addition to the database 167, and the memory unit may have a function of storing an operation result generated by the processor 163a, data input to the communication unit 161a, and the like.

[Communication Unit 161a and Communication Unit 161b]

The server 151 and the terminal 152 can transmit and receive data with the use of the communication unit 161a and the communication unit 161b. A hub, a router, a modem, or the like can be used for the communication unit 161a and the communication unit 161b. Data may be transmitted or received through wire communication or wireless communication (e.g., radio waves or infrared rays).

This embodiment can be combined with the other embodiment as appropriate.

This application is based on Japanese Patent Application Serial No. 2019-106667 filed with Japan Patent Office on Jun. 7, 2019, the entire contents of which are hereby incorporated by reference.

What is claimed is:

1. A machine translation method comprising the steps of:
translating an original document with a neural network to generate a first translated document;
analyzing the first translated document and detecting a first translated sentence having a possible mistranslation from the first translated document;
detecting a first original sentence corresponding to the first translated sentence from the original document;
determining a modification-target word or phrase which is expected to be a cause of mistranslation from words and phrases contained in the first original sentence of the original document;
modifying the original document to generate a modified original document by replacing the modification-target word or phrase included in the original document with a high frequency word in learning data used for learning in the neural network; and translating the modified original document with the neural network to generate a second translated document.

2. The machine translation method according to claim 1, wherein the high frequency word is selected from synonyms of the modification-target word or phrase.

3. The machine translation method according to claim 1, wherein the step of analyzing the first translated document comprises a step of performing an error check of the first translated document.

4. The machine translation method according to claim 1, wherein the first translated sentence having the possible mistranslation is at least one of a sentence in which the same word or phrase appears repeatedly, a sentence which contains a word or phrase that does not contained in the original document, a sentence with a grammatical error, and a sentence containing a special symbol.

5. A machine translation method comprising the steps of:
translating an original document with a neural network to generate a translated document;
analyzing the translated document to obtain a score based on translation accuracy of the translated document;
judging whether the score satisfies a termination condition of error modification; and
repeating modification of the original document to generate a modified original document, generation of a latest translated document based on the modified original document, and obtainment of the score of the latest translated document until the termination condition is satisfied,
wherein the modification of the original document comprises the steps of:
  detecting a translated sentence having a possible mistranslation from the translated document when the score does not satisfy the termination condition;
  detecting an original sentence corresponding to the translated sentence from the original document;
  determining a modification-target word or phrase which is expected to be a cause of mistranslation from words and phrases contained in the original sentence of the original document; and
  replacing the modification-target word or phrase in the original document with a high frequency word in learning data used for learning in the neural network to obtain the modified original document, and
wherein the generation of the latest translated document comprises the step of translating the modified original document that has reflected a latest modification with the neural network.

6. The machine translation method according to claim 5, wherein the high frequency word is selected from synonyms of the modification-target word or phrase.

7. The machine translation method according to claim 5, wherein the step of analyzing the translated document comprises a step of performing an error check of the translated document.

8. The machine translation method according to claim 5, wherein the translated sentence having the possible mistranslation is at least one of a sentence in which the same word or phrase appears repeatedly, a sentence which contains a word or phrase that does not contained in the original document, a sentence with a grammatical error, and a sentence containing a special symbol.

9. A machine translation system comprising a processor, wherein the processor is configured to translate an original document with a neural network to generate a first translated document, analyze the first translated document, detect a first translated sentence having a possible mistranslation from the first translated document, detect a first original sentence corresponding to the first translated sentence from the original document, determine a modification-target word or phrase which is expected to be a cause of mistranslation from words and phrases contained in the first original sentence of the original document, replace the modification-target word or phrase in the original document with a high frequency word in learning data used for learning in the neural network to modify the original document as a modified original document, and translate the modified original document with the neural network to generate a second translated document.

10. A non-transitory computer-readable storage medium storing a program which, when executed by a processor, cause the processor to execute the step of:
translating an original document with a neural network to generate a first translated document;
analyzing the first translated document and detecting a first translated sentence having a possible mistranslation from the first translated document;
detecting a first original sentence corresponding to the first translated sentence from the original document;
determining a modification-target word or phrase which is expected to be a cause of mistranslation from words and phrases contained in the first original sentence of the original document;
modifying the original document to generate a modified original document by replacing the modification-target word or phrase included in the original document with a high frequency word in learning data used for learning in the neural network; and
translating the modified original document with the neural network to generate a second translated document.

* * * * *